March 18, 1930.   C. E. RANDALL ET AL   1,750,785
OPTICAL APPARATUS FOR PROJECTING ILLUMINATED SIGNS UPON SCREENS
Filed Dec. 13, 1928   3 Sheets-Sheet 1
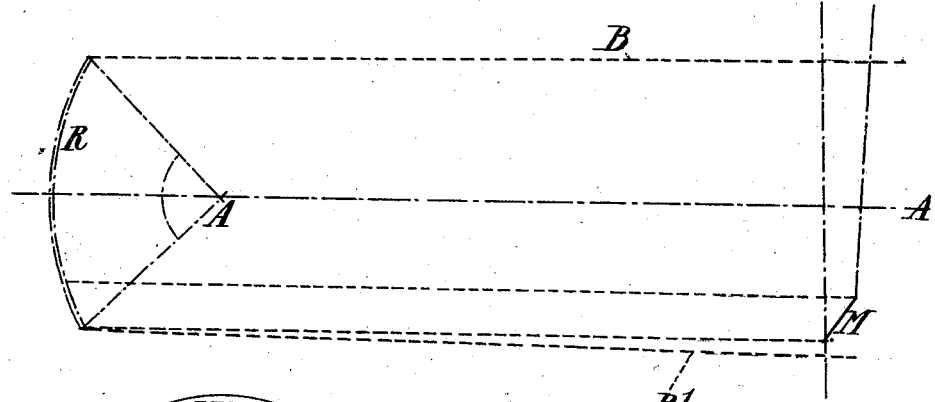
Fig.1.
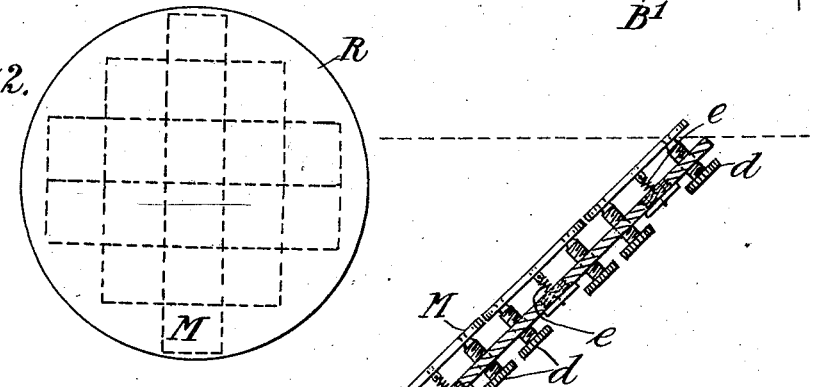
Fig.2.
Fig.3.
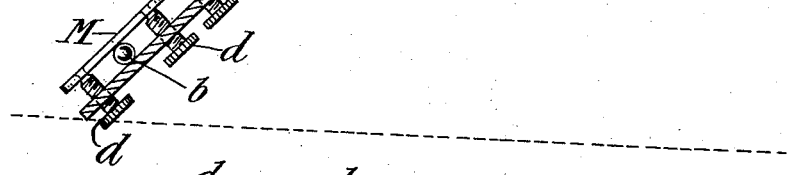
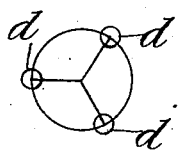
Fig.3a.
Inventors
Cyril E. Randall
Leonard A. Thompson
By Henry Orth Jr.
Atty.

March 18, 1930.  C. E. RANDALL ET AL  1,750,785
OPTICAL APPARATUS FOR PROJECTING ILLUMINATED SIGNS UPON SCREENS
Filed Dec. 13, 1928   3 Sheets-Sheet 2
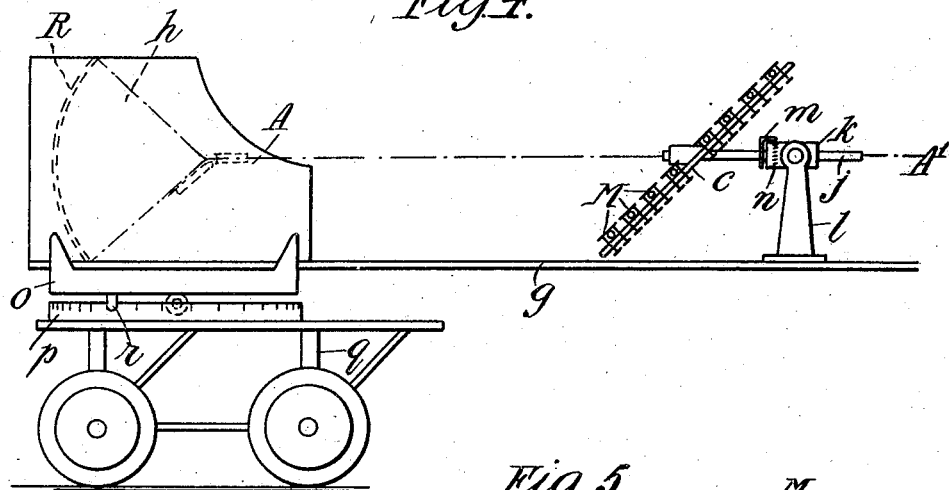
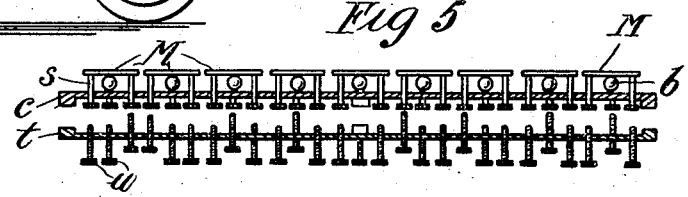
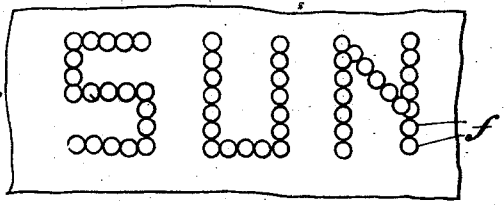
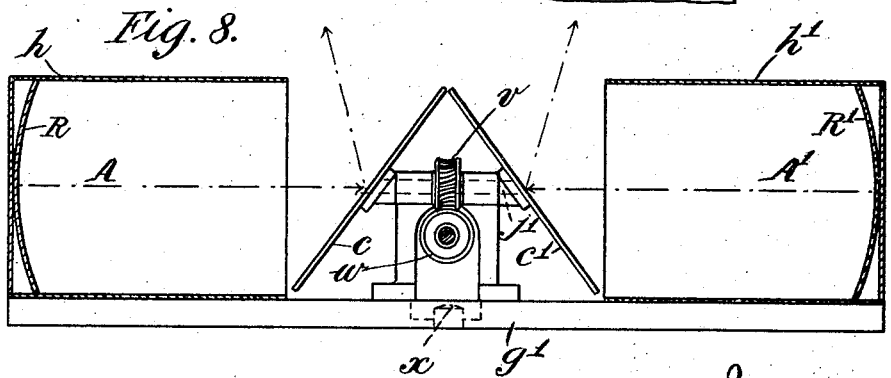
Inventors
Cyril E. Randall
Leonard R. Thompson,
By Henry Orth Jr.
Atty Patented Mar. 18, 1930

1,750,785

UNITED STATES PATENT OFFICE

CYRIL ERNEST RANDALL AND LEONARD ROBERT THOMPSON, OF LONDON, ENGLAND, ASSIGNORS TO JOHN CLIFFORD SAVAGE, OF LONDON, ENGLAND

OPTICAL APPARATUS FOR PROJECTING ILLUMINATED SIGNS UPON SCREENS

Application filed December 13, 1928, Serial No. 325,848, and in Great Britain December 14, 1927.

The present invention relates to optical apparatus for projecting illuminated signs, designs, characters or devices upon screens with high light efficiency. It is particularly the object of these improvements to provide an optical combination suitable for the projection of characters or signs upon distant screens, such as clouds, with the greatest possible illumination or light efficiency and definition and without the use of a stencil or other facsimile of the desired sign which would cut off a substantial portion of the available light from the light source. The use of the clouds as a diffusing screen is particularly difficult because of their irregular formation and the fact that the projected beams of light cannot always be normal to a mean planar surface. Moreover, the height of the clouds creates a problem in regard to obtaining sufficient illumination of the lines of the sign or device so that the latter shall be easily recognizable. It is essential that a sign projected on the clouds shall be of dimensions so large in proportion to the average irregularities, that the inevitable distortion produced by such irregularities shall not seriously affect the characters or outlines as viewed from the ground. Nevertheless, and in spite of the large areas over which the projected light must be distributed, the degree of illumination must be such that the sign is sufficiently brilliant for all practical purposes.

An optical combination in accordance with these improvements is adapted for producing on the distant screen an assemblage or disposition of illuminated areas or light spots of appropriate brilliance and conforming to any desired shape or configuration, the said combination, within the limits of the optically imperfect units of which it is constituted, being productive of a surprisingly high light efficiency as on account of the fact that no stencil or other facsimile of the desired sign is used the whole or substantially the whole of the available light of the light source is used in the formation of the image upon the screen. Furthermore, an optical combination in accordance with these improvements enables any desired sign, character or outline to be composed and projected upon the screen, or any one of a number of signs, characters or outlines to be selected by an operator for projection.

According to this invention, the optical combination comprises a projector consisting of a powerful source of light, an optical unit having the said light at or near its focus for projecting a beam of very limited cross sectional dimensions, such as a searchlight beam, and an assemblage or mosaic of adjustable mirrors so disposed as substantially to occupy an inclined cross sectional area of such beam, the adjustment of the individual mirrors being such as to project their individual beams in accordance with the desired arrangement or disposition of light spots on the distant screen.

It is not sufficient for the purposes of this invention merely to arrange an assemblage or mosaic of mirrors set at different angles relatively to one another for the reflection of the light from a powerful source of light such as an electric arc, but it is necessary to employ in the combination an optical unit, such as a concave (spherical or parabolic) mirror adapted for collecting the light from the source and projecting a beam of the character indicated.

It is generally accepted in searchlight practice that the cross sectional area of the beam at a given range, or the angular spread of the beam, is a function of the diameter of the light source and the amount of concavity or radius of curvature of the reflector. If the light source is placed at a suitable distance from the focus of the reflector, the projected beam would reproduce, at a desired distance, an image of the source of light. In practice, however, this effect is not easy to attain, for, in the first place, the production in glass or metal of a large reflecting surface having an exact optical contour is extremely difficult. In the second place, although each unit area of the reflecting surface picks up an image of the light source, the projection thereof is not of the same size or shape in each case owing to the changing angle of view. In the third place, owing to the large aperture or angular grasp of the object at the focus of the reflector it is difficult in practice to produce a perfect, or substantially perfect, optical contour of the projected images. Thus, the rays proceeding from the reflector to the screen not only contain a number of different angular views of the light source but they also suffer from a geometrical error of direction of such views, so that the images projected from the different areas are not exactly superimposed on the screen and the actual cross sectional dimensions of the beam are greater than those which are calculated theoretically. These are the reasons for inefficiency and loss of intensity in searchlight beams.

In a combination in accordance with these improvements, a searchlight reflector of good quality is employed with an electric lamp (projector lamp or arc) at its focus and the assemblage or mosaic of mirrors occupying an inclined cross sectional area of the beam is arranged at a relatively short distance from the reflector so that each one of such mirrors picks up from the reflector and transmits a substantially perfect image of the light source. This can be demonstrated by taking a searchlight of, say, 24 inches diameter and an electric lamp, and adjusting the focus for a distance of say 50 feet. A small piece of silvered plate glass mirror of, say 2" x 2", introduced into the beam at a short distance, say 2 feet, from the reflector will project on to a screen at a distance of 50 feet a very clear and well defined or crisp image of the lamp filament. Moreover, the focusing need not be particularly accurate for the distance of the screen can be increased or decreased without series loss of definition. The effect thus obtained is equivalent to that which would be obtained by a stepping down of the reflector which really amounts to a cutting down of the effective reflector surface area utilized. Angular adjustment of the small mirror causes corresponding displacement of the image on the screen, and if a mosaic or assemblage of small mirrors is arranged to occupy an inclined cross section of the beam from the reflector, it is clear that each one of such mirrors will produce the same effect as that described above with reference to the single mirror. In fact, each one of the mirrors will pick up from a small area of the reflector an image of the light source and will throw such image on to the distant screen. In the event of some small areas of the reflector being less optically accurate or efficient than others, this will make little difference to the resultant effect which is obtained by adjusting each one of the individual mirrors to throw its spot of light on to the predetermined line of a sign or character to be produced. In the general assemblage or disposition of spots of light constituting the sign or device on the screen, the majority will be well-defined images of the light source and will therefore be of maximum brilliance and crisp outline which is of importance when considering the easy recognition of a sign or character by distantly situated observers. It is important to observe that the brightest and best defined spots of light are produced on the distant screen only when the source of light is placed at the correct distance from the optical element, a searchlight reflector or the equivalent, for it must be the aim and object to throw on to the said screen a number of images of the source of light employed.

In order to enable the invention to be readily understood, reference is made to the accompanying drawings illustrating suitable combinations and constructions in accordance with these improvements, in which drawing:—

Figure 1 is a simple diagram illustrating the optical principle underlying this invention.

Figure 2 shows in front elevation the relative dimensions and axial disposition of the mirror and reflector of Figure 1, and indicates by dotted lines a disposition of mirrors on a mirror board.

Figure 3 is a sectional view upon a larger scale of a mirror board such as is indicated in Figure 2, the mirrors above the optical axis being adjustable by the aid of screws and springs and the mirrors below the optical axis being adjustable by the aid of screws and ball and socket mountings.

Figure 7:
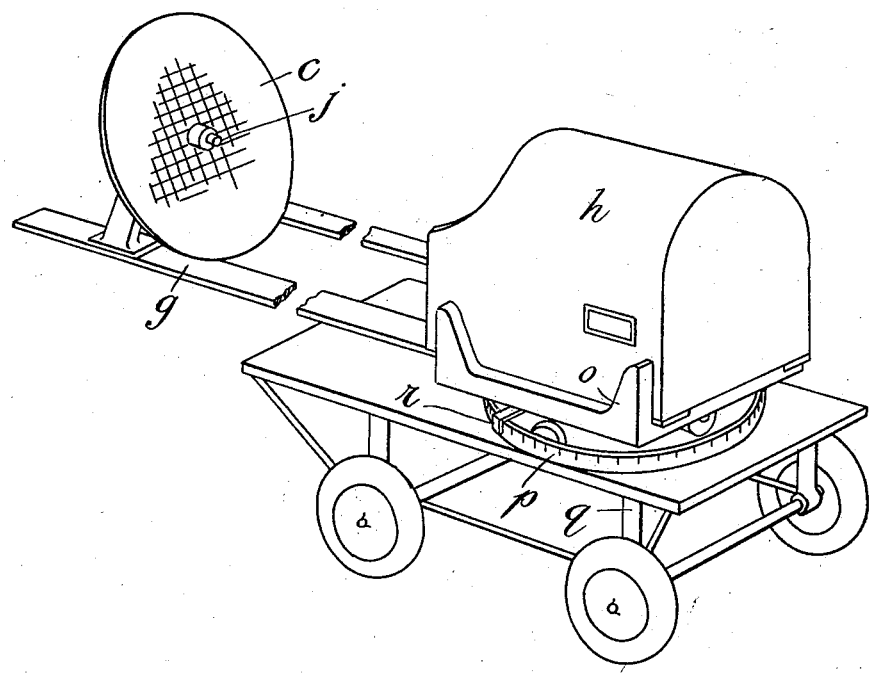

Fig. 3$^a$ is a diagrammatic view showing the arrangement of the adjusting screws for the individual mirrors.

Figure 4 is a more or less diagrammatic side elevation of a wheeled carriage with swivel mounting for the optical combination employed in accordance with these improvements.

Figure 5 diagrammatically illustrates a simple means for adjusting the tilt of the individual mirrors on the mirror board.

Figure 6 is a representation of a sign as produced by an optical combination of these improvements.

Figure 7 is a perspective view of a construction of apparatus similar to that seen in side elevation in Figure 4.

Figure 8 is a diagrammatic side elevation of a double combination, the elements of which may co-operate in the production of a single display.

Referring to Figure 1, if a powerful source of light, such as that provided by an electric arc, be placed at the focus A of a concave reflector R which may be either of the spherical or parabolic or other searchlight type, practically the whole of the light will be projected in the direction of the axis A—A' as a substantially parallel beam bounded by the dotted lines B—B'. If a small plane mirror M is placed in the path of the beam at a suitably short distance from A and tilted to an angle of 45° as shown it will throw on to a distant screen an image of the source of light, the direction Z of the throw being perpendicular to the axis A—A'. For angles of tilt less than 45°, the throw of the mirror M will not be perpendicular to A—A' but will be at angles less than 90° and in the direction of the projector A, R, the limit being a tilt which would cause the throw M—Z to pass just over the reflector R. For any degree of tilt within the limits just mentioned, it is possible also to impart a lateral tilt to the mirror M so that the throw will be to one side or the other of the plane of the paper. Thus, if the mirror M be mounted upon a universal adjustment, it is possible to direct the throw M—Z on to any given spot over a very extensive screen area. Figure 2 shows in end elevation the relation between the mirror M and reflector R. If a number of mirrors similar to M be arranged as a mosaic in accordance with the rectangles in dotted lines in Figure 2, it will be seen that the whole cross sectional area of the beam B B' may be occupied by mirrors and that if each mirror is capable of independent universal adjustment, it is possible to direct the spots of light thrown by such mirrors so that they may have a pre-determined disposition.

Figure 3 illustrates in sectional side elevation and to a larger scale, an assemblage or mosaic of mirrors M corresponding with that indicated by dotted lines in Figure 2. Beneath the axis A—A' each mirror is supported centrally by a ball and socket mount $b$ on a mirror board $c$ which is supported at an angle of 45° to the axis A—A'. At the back of each mirror M there are three adjusting screws $d$ having the triangulated disposition indicated by the diagram beneath the lowermost mirror. It will be apparent that by appropriate adjustment of the screws $d$ it is possible to impart any desired degree of tilt to each individual mirror M within the limits hereinbefore referred to. Above the axis A—A' each one of the mirrors M is seen to be influenced by a tension spring $e$ anchored to the mirror board $c$. A spring $e$ holds its respective mirror against the adjusting screws $d$ and it will be apparent that appropriate adjustments of such screws will produce desired tilting adjustments of the mirrors M for the purpose explained.

From the foregoing, it will now be readily understood how it is possible to adjust the angles of tilt of the various mirrors so that, for example, the spots of light thrown on to a distant screen by such mirrors may have the disposition illustrated in Figure 6, in which the spots of light $f$ constitute an outline of the letters composing the word "Sun".

As each spot of light is virtually a projected image of the light source, it will be of maximum brilliance and good definition and although the illuminated display of the word is spread out over a large area, particularly when the clouds are used as the intercepting screen, nevertheless owing to the brightness and sharpness of the spots $f$ the word or other sign or design displayed is clearly readable or recognizable by distantly situated observers.

When the mirrors M of an assemblage or mosaic have been individually adjusted for the production of a given word or sign, it will be apparent that revoluble adjustment of the mirror board $c$ about the axis A—A' will result in an alteration in the elevation and direction of the display on the distant screen. In Figures 4 and 7, which show the arc A and reflector R enclosed in a lamp housing $h$ mounted on a base $g$, the mirror board $c$ supporting the universally adjustable mirrors M is carried by a shaft $j$ supported so that its longitudinal axis coincides with the axis A—A'. Thus, the shaft $j$ may be revolubly adjustable in a bearing sleeve $k$ supported by uprights $l$ on the base $g$. A pointer $m$ on the shaft $j$ may work over a scale $n$ on the sleeve $k$ to indicate the number of degrees through which the mirror board $c$ is adjusted around the shaft $k$. The base $g$ may be supported on a turntable $o$ circularly adjustable on a bed $p$ mounted on a wheeled carriage $q$. A pointer $r$ on the turntable $o$ indicates on a scale on the bed $p$ the degree of circular adjustment of the turntable. Thus the apparatus comprising a mirror board $c$ having its mirrors M "set-up" for the production of a given display, may be wheeled to a convenient place and, by circular adjustment of the turntable $o$ and revoluble adjustment of the mirror board $c$, may be employed in giving a display on any suitably disposed distant screen or cloud area.

Means, such as those illustrated in Figure 5, may be adopted for quick setting or re-setting of the mirrors M for the production of a given sign or display. The said mirrors M, universally mounted and preferably acted upon by springs which constantly tend to cause the mirrors to assume a mean position, are provided each with three adjustment tappets or rods $s$ projecting through suitable holes in the mirror board $c$. A board $t$ corresponding with the mirror board $c$ is fitted with a number of screws $u$ or adjustable devices distributed over the board $t$ to correspond with the distribution of the tappets $s$ over the board $c$. The screws $u$ or other adjustable devices are all set for predetermined mirror adjustments. Upon applying a board $t$ accurately to the back of a mirror board $c$, the devices $u$ will engage the tappets $s$ and impart their setting to such tappets. In this way, all the mirrors M on the board $c$ will be simultaneously and instantaneously adjusted for the production of a given sign or effect. When the board $t$ is subsequently withdrawn, the spring devices, if used, will cause all mirrors M to move back into the same plane ready for the application of a fresh board t. In this way it is possible to avoid the slow process of setting the mirrors M by hand for each display, for a number of interchangeable boards t may be provided each having a different and appropriate setting of its screws u. As an alternative, it would be possible to provide cam surfaces or projections movable past the tappets s and adapted for imparting appropriate settings thereto.

In the modification illustrated in Figure 8 there are two opposed projectors A, R and A' R' in respective housings h h' mounted on a common base g'. Between the two projectors there are two mirror boards c c' each set at 45° to the optical axis and back to back so that the said boards enclose between them an angle preferably of 90°. Each of the boards, of course, is fitted with an assemblage or mosaic of mirrors but it is not necessary to show these in this figure. The two boards c c' are fixedly mounted on a common shaft j' which can be revolubly adjusted around the optical axis for the reason already explained with reference to Figure 4. This revoluble adjustment may be performed by the aid of worm gearing v w. The base g may be mounted on a turntable or on any form of swivel bearing x. The operation of this duplex projector is the same as that hereinbefore described with reference to the single projector. It is only necessary to explain that the mirrors of the two boards c c' can be adjusted so that they co-operate for the production of a single sign or display.

The lamp housings, such as h, are usually a dead black within so that no false reflection can occur. Any suitable powerful source of light may be employed, although the electric arc is possibly the most suitable and advantageous.

From the foregoing it will be apparent that it is possible to spread a display over a very extensive cloud area, for example, when this is desired. It would not be practical to employ, or in many cases to obtain, a lens or reflector having such a wide angle of spread as to enable this to be done directly with success. With the mirror assemblage or assemblages arranged and operated as hereinbefore described it is possible to obtain effects such as are indicated without distortion or loss of brilliance.

By interposing suitable optical devices in the path of the rays, the illuminated sign or other display may be coloured or otherwise affected as desired.

It is possible to make various changes and modifications without departing from the invention. For example, where the use of reflectors and mirrors has been referred to, these may be substituted, where practically possible, by prisms, reflecting prisms, or lens devices. Also, although projection by a stationary assemblage of mirrors has been described, it may be possible without departing from the invention to use moving or revolving mirror assemblages which produce effects involving the principle of persistence of vision.

We claim:—

1. Method of projecting signs on to distant screens, consisting in projecting an approximately parallel beam of light on to an assemblage of light transmitters said assemblage intersecting the beam of light at a relatively short distance from the projector and adjusting individual transmitters so that light spots are thrown on to the distant screen in predetermined disposition for constituting the sign.

2. Method of projecting signs on to distant screens, consisting in projecting an approximately parallel beam of light on to an assemblage of individually adjustable mirrors said assemblage angularly intersecting said beam of light at a relatively short distance from the projector, and adjusting individual mirrors so that light spots are thrown on to the distant screen in pre-determined disposition for constituting the sign.

3. Method of projecting signs on to distant screens, consisting in arranging a light source at the focus of a concave reflector of such form as to project an approximately parallel beam of light and intercepting the resultant beam with an assemblage of mirrors intersecting said beam at a relatively short distance from the projector, and disposed to occupy an inclined cross sectional area of said beam, the mirrors of said assemblage being individually adjusted for throwing light spots on to the distant screen in pre-determined disposition for constituting the sign.

4. Method of projecting signs on to distant screens consisting in producing a powerful substantially parallel beam of light, splitting up said beam into a number of pencils of light, and individually directing said pencils to produce light spots in pre-determined disposition on a distant screen for constituting a sign of the desired character on said screen.

5. Optical apparatus for projecting signs on to distant screens comprising in combination a projector adapted for producing a defined substantially parallel beam of light, and a mosaic of light transmitters disposed for angular intersection of said beam, said transmitters having pre-determined individual directions of throw for the purpose of forming a luminous sign comprised of or comprising a plurality of light spots arranged in the desired order upon the screen without the use of a stencil or other facsimile of the sign.

6. Optical apparatus for projecting signs on to distant screens comprising in combination a projector adapted for producing a defined beam of light, and a mosaic of mirrors disposed for angular intersection of said beam, the mirrors of said mosaic being individually adjusted for the purpose forming a luminous sign comprised of or comprising a plurality of light spots arranged in the desired order upon the screen without the use of a stencil or other facsimile of the sign.

7. Optical apparatus for projection of signs on to distant screens, comprising in combination a reflector capable of producing a substantially parallel beam of reflected light focus, a powerful source of light positioned at the focus of said reflector, and a mosaic of mirrors supported for angular intersection of the beam from said reflector the mirrors of said mosaic being individually adjusted for the purpose of forming a luminous sign comprised of or comprising a plurality of light spots arranged in the desired order upon the screen without the use of a stencil or other facsimile of the sign.

8. Optical apparatus for projection of signs on to distant screens, comprising in combination a searchlight reflector, a powerful source of light at the focus thereof, and a mosaic of individually adjustable mirrors supported at a relatively short distance from said reflector and so as to occupy an inclined cross sectional area of said beam whereby any one of a number of luminous signs composed of a plurality of spots of light arranged in the desired order may be formed upon the distant screen without the use of a slide or other facsimile of the desired sign.

9. Optical apparatus for projection of signs on to distant screens, comprising in combination a searchlight projector, an assemblage of mirrors, a backing adapted for supporting said assemblage in a plane inclined to the axis of the projected beam and at a relatively short distance from the projector and individual adjustment means for said mirrors whereby any one of a number of luminous signs composed of a plurality of spots of light arranged in the desired order may be formed upon the distant screen without the use of a slide or other facsimile of the desired sign.

10. Optical apparatus for projection of signs on to distant screens, comprising in combination a searchlight projector for producing a substantially parallel beam of light, an assemblage of mirrors for producing spots of light on said screen arranged in appropriate order for constituting said sign, a carrier adapted for supporting said assemblage in a plane inclined to the axis of the projected beam said carrier being disposed at a relatively short distance from the projector, and a revoluble mounting for said carrier permitting the latter to be revolubly adjusted around said axis for the purpose set forth.

11. Optical apparatus for projection of signs on to distant screens, comprising in combination a light projector for producing an approximately parallel beam of light, an assemblage of mirrors disposed so as to occupy an inclined cross sectional area of the projected beam, universal mountings for individual mirrors, and adjustment means operative on individual mirrors for changing their angles of tilt in said mountings whereby any one of a number of luminous signs comprising a plurality of spots of light arranged in desired order may be formed upon said screen by appropriate adjustment of said mirrors and without the use of a slide or other facsimile of the desired sign.

12. Optical apparatus for projection of signs on to distant screens, comprising in combination a light projector for producing a substantially parallel beam of light, an assemblage of mirrors disposed so as to occupy an inclined cross sectional area of the projected beam, universal mountings for individual mirrors, tappet devices on said mirrors, and means adapted for the engagement of said tappets for simultaneous appropriate adjustment of mirrors of the assemblage for the purpose set forth.

13. Optical apparatus for projection of signs on to distant screens comprising in combination a projector for producing a substantially parallel beam of light, and an assemblage of light transmitters disposed to occupy a cross sectional area of said beam, each transmitter being adapted for throwing on to a distant screen an image of the source of light in pre-determined relation to the images thrown by other transmitters of the assemblage.

14. Optical apparatus for projection of signs on to distant screens comprising in combination a projector for producing a substantially parallel beam of light, an assemblage of light transmitters disposed to occupy a cross section of the beam, and bearing means revolubly supporting said assemblage for giving revoluble adjustment of the assemblage about the axis of said beam.

15. Optical apparatus for projection of signs on to distant screens, comprising in combination opposed projectors for producing substantially beams of light, and assemblages of mirrors each assemblage being disposed to occupy a cross section of a respective beam, each individual mirror of the assemblages being adapted for throwing on to a distant screen an image of the source of light in pre-determined relation to the images thrown by other mirrors of the assemblages whereby a luminous sign composed of a plurality of spots of light may be produced upon the distant screen without the use of a slide or other facsimile of said sign.

16. Cloud sign projector comprising a base, a projector on said base, bearing means on said base providing an axis of revolution coinciding with the axins of the beam of the projector, and an assemblage of mirrors revolubly supported by said bearing means and disposed for non-perpendicular intersection by the axis of said beam.

17. Cloud sign projector comprising a base, a projector on said base, bearing means on said base providing an axis of revolution coinciding with the axis of the beam of the projector, a planar carrier revolubly supported by said bearing means, and a mosaic of mirrors each mirror of such mosaic being mounted for universal tilting on said carrier substantially as set forth.

In testimony whereof, we affix our signatures this 27th day of November, 1928.

CYRIL ERNEST RANDALL.
LEONARD ROBERT THOMPSON.